United States Patent [19]
Sohn

[11] Patent Number: 4,659,184
[45] Date of Patent: Apr. 21, 1987

[54] ACOUSTIC OPTICAL LIGHT MODULATOR

[75] Inventor: Sang H. Sohn, Seoul, Rep. of Korea

[73] Assignee: Gold Star Co., Ltd., Seoul, Rep. of Korea

[21] Appl. No.: 744,543

[22] Filed: Jun. 14, 1985

[30] Foreign Application Priority Data

Jun. 16, 1984 [KR] Rep. of Korea .............. 5655/84[U]

[51] Int. Cl.$^4$ ................................................ G02F 1/33
[52] U.S. Cl. ..................................... 350/358; 350/371
[58] Field of Search ........................ 350/358, 371–373

[56] References Cited

U.S. PATENT DOCUMENTS 3,729,250 4/1973 Kusters et al. ..................... 350/358
3,944,334 3/1976 Yano et al. ......................... 350/358

FOREIGN PATENT DOCUMENTS 145333 12/1980 German Democratic Rep. ................................................. 350/358
28076 2/1980 Japan .................................... 350/358
953611 8/1982 U.S.S.R. ............................... 350/358

Primary Examiner—Punter: William H.
Attorney, Agent, or Firm—Birch, Stewart, Kolasch & Birch

[57] ABSTRACT

An acoustic optical light modulator comprising a hexahedral ultrasonic wave media having a bottom and two sides perpendicular to the bottom, an ultrasonic wave generator attached to the bottom and controlled by a high frequency oscillator connected thereto and a laser source radiating a laser beam incident upon and reflected on a plane of the ultrasonic waves formed in the media, characterized in that the two sides of the media are provided with symmetrical grooves of V-shaped section in the middle portion of the each side thereof, the lower inclined surfaces of the grooves being formed with anti-reflective films, and the remaining surface portions of the sides including the upper inclined surface of the grooves and the bottom is coated with heat absorbing films which absorb light and heat.

3 Claims, 2 Drawing Figures

ACOUSTIC OPTICAL LIGHT MODULATOR

BACKGROUND OF THE INVENTION

1. Field of the Invention

This invention relates to an acoustic optical light modulator used for modulating a laser beam in a system utilizing the laser beam, such as a laser printer, a facsimile, a video disk or a laser display and in particular to an acoustic optical light modulator in which ultrasonic waves are utilized for modulating the intensity of laser beam.

In such a light modulator, so called a ultrasonic wave light modulator and an ultrasonic wave media having a constant refractive index are used to propagate ultrasonic waves of a periodic density in a certain direction in the media and a laser beam incident in the ultrasonic wave media at an appropriate angle to the direction of the ultrasonic waves is modulated to be a diffractive beam reflected on a plane of the ultrasonic waves. The principle of modulating a laser beam in said ultrasonic wave media is varying the density of the ultrasonic waves propagated in the media by regulating the output of the ultrasonic waves thereby modulating the intensity of the diffractive beam reflected on the plane of the ultrasonic waves.

2. Description of Prior Art

An example of a conventional acoustic optical light modulator is explained with reference to FIG. 1. In FIG. 1, reference numeral 1 designates a hexahedral ultrasonic wave media having a bottom 1a and two sides 1b and 1c perpendicular to the bottom. A ultrasonic wave generator 2 provided with two electrodes 2a and 2b is attached to the bottom 1a of the media 1. Connected to the electrodes 2a and 2b is a high frequency oscillator 3 controlled by a video signal. If a frequency modulated voltage from the high frequency oscillator 3 controlled by a video signal is applied to the two electrodes 2a and 2b of the ultrasonic wave generator 2, the generator 2 propagates ultrasonic waves 4 in the ultrasonic wave media 1 in the direction of the electric field in proportion to the voltage applied thereto. The ultrasonic waves 4 propagated in the media 1 are the periodic compressional waves and the intensity of the output of the ultrasonic waves 4 generated by the ultrasonic wave generator 2 varies in compliance with the amplitude of the voltage applied thereto. However, since the frequency of the ultrasonic waves is kept constant, the periodicity of the compressional waves is also kept constant to form equidistant light reflective planes 4a of close ultrasonic wave portions. Thus, if a laser beam 6 radiated from a laser source 5 is incident in the ultrasonic wave media 1 through one side 1b of the media, the incident laser beam 6 is reflected on one of the above-described light reflective planes 4a formed in the media and a reflected diffractive beam 6a leaves out of the media 1 through the other side 1c of the media. In other words, if the laser beam 6 is incident upon the light reflective plane 4a in the ultrasonic wave media under the condition satisfying the Bragg's Law set forth below, the reflected laser beam becomes the diffractive beam 6a, $$2\lambda_s \sin \theta = \lambda \qquad (1)$$

wherein $\lambda_s$ is the wavelength of the ultrasonic wave, $\lambda$ is the wavelength of the laser beam and $\theta$ is an incident angle at which the laser beam is incident upon the plane of the ultrasonic waves.

Then the intensity of the diffractive beam 6a can be varied if the density of the light reflective plane 4a of the ultrasonic waves is varied by controlling the output from the ultrasonic wave generator 2, so the laser beam 6 can be intensity modulated according to the following formula, $$I = I_0 \sin^2 [\lambda(p \cdot L)^{\frac{1}{2}}/\lambda] \qquad (2)$$

wherein I is the intensity of the diffractive beam, $I_0$ is the intensity of the incident laser beam, P is the intensity of output of ultrasonic wave, L is the width of the ultrasonic wave media and $\lambda$ is the wavelength of the laser beam used.

In the conventional light modulator described, as the both sides 1b and 1c of the ultrasonic wave media 1 are perpendicular to the bottom 1a, the laser source 5 should be mounted slantwise at a certain angle with respect to the side 1b of the media 1 in order that the laser beam 6 is incident upon the plane 4 of the ultrasonic waves in the media under the condition satisfying the Bragg's Law, that is at an angle $\theta$ to the plane 4, accompanying the inconveniences in designing and manufacturing the system. Moreover, since the light reflective plane 4a in the ultrasonic wave media 1 is formed of close ultrasonic waves, the plane cannot constitute a perfect light reflective surface and especially due to reduction in the output of the ultrasonic waves caused by diffusion of the ultrasonic waves, only less than 70% of the laser beam 6 is modulated to be the diffractive beam 6a. A non-diffractive beam 6b transmits the equidistant light reflective plane 4a and a reflective beam 6d is reflected at the side 1c. The remainder is not modulated to pass through the media 1 without being used, thus not only causing great loss in the laser beam but also requiring an additional light absorbing body 7 mounted outside the media. Furthermore, loss of light due to the reflective beam 6c on the surface of the side 1b is unavoidable and so is the instability of light modulation caused by the effect of heat generated in the media 1 in case that a high power laser beam is used such as Ar+ or Kr+ laser beam.

SUMMARY OF THE INVENTION

Accordingly, one object of this invention is to provide a light modulator of novel construction, in which a laser source, a light modulator and a modulated beam are aligned in a line to accomplish the desired light modulation even though the laser beam is incident in the media horizontally thereby facilitating design and manufacture of the system.

Another object of the invention is to provide a light modulator in which the intensity of the modulated diffractive beam is increased by eliminating diffusion of an ultrasonic waves incurred in the center of the media and preventing reduction of the output of the ultrasonic wave.

Yet another object of the invention is to provide a light modulator in which the beam which is not modulated can be absorbed within the media without requiring for an additional light absorbing body mounted outside the media and the instability of the output of the diffractive beam is avoidable by absorbing and discharging the heat generated by a high power laser beam in the media.

Yet another object of the invention is to provide a light modulator in which loss of beam due to reflection of the incident beam on the surface of the media can be prevented.

These and other objects have been achieved according to the invention by forming grooves of V-shaped section on the two sides of the ultrasonic wave media where the laser beam is incident and the diffractive beam leaves out respectively, vacuum depositing anti-reflective films of magnesium fluoride in special areas of the said V-shaped grooves and coating light and heat absorbing films of graphite having superior heat conducting characteristics on the bottom and both sides of the media except for the areas deposited with anti-reflective films.

BRIEF DESCRIPTION OF THE DRAWINGS

The construction and the operational effects of the invention will be better understood by reference to the following detailed description when considered in connection with the accompanied drawings wherein.

DETAILED DESCRIPTION OF THE PREFERRED EMBODIMENT

Figure 1:
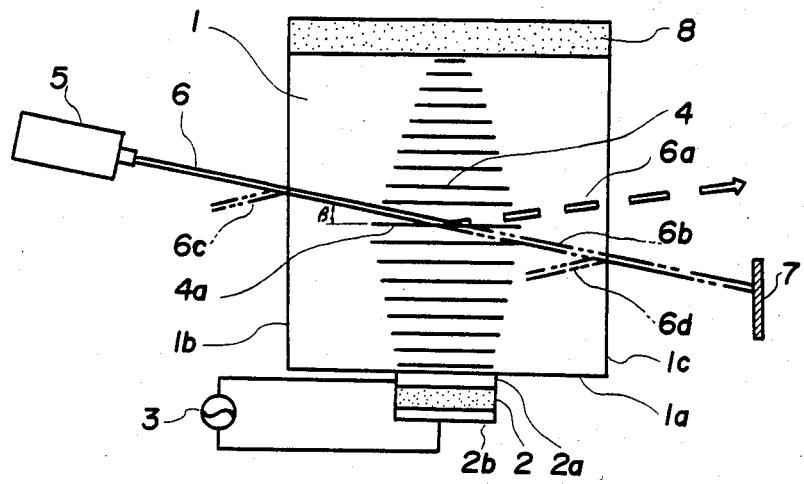
FIG. 1 is a sectional view of a conventional light modulator schematically illustrating the construction and the operation of the system.
Figure 2:
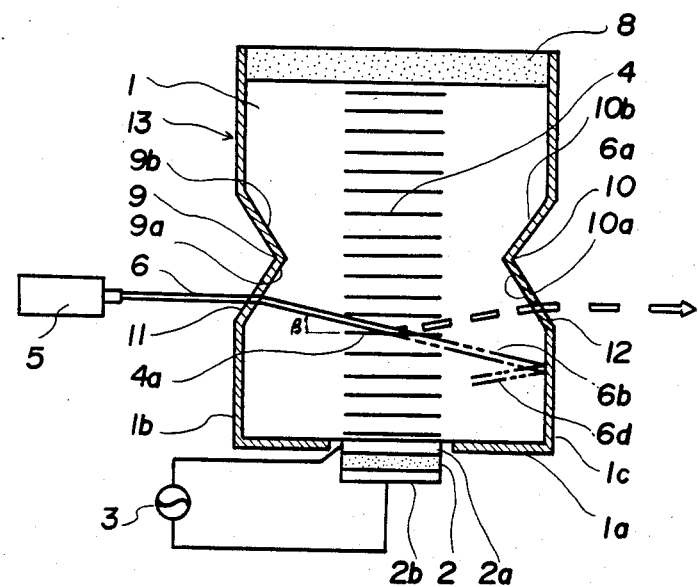
FIG. 2 is a sectional view of one embodiment of the present invention illustrating the construction and the operation of the embodiment.

Referring now to FIG. 2, the middle portions on the two sides 1b and 1c of an ultrasonic wave media 1 where a laser beam 6 radiated from a laser source 5 is incident upon and a modulated beam 6a leaves out of the media are formed with two grooves 9 and 10 of V-shaped section and anti-reflective films of magnesium fluoride are vacuum deposited onto the lower inclined surfaces 9a and 10a of the grooves 9 and 10. The remaining upper inclined surfaces 9b and 10b of the grooves 9 and 10, both sides 1b and 1c of the media 1 except for the grooves 9 and 10 and the bottom 1a are coated with light and heat absorbing films of, for example, graphite. The reference numeral 8 designates an ultrasonic wave absorbing body made of copper or resin for accelerating modulation of the laser beam by absorbing the ultrasonic wave generated in the media 1 as much as possible.

The operation and effect of the invention will be described below.

As the laser beam 6 is incident upon the lower inclined surface 9a of the groove 9 formed in the middle portion of the one side 1b of the media 1, the beam 6, although radiated from the source 5 placed on the same horizontal plane as the media 1, can be refracted at an anti-reflective film 11 formed on the lower inclined surface 9a and diffracted on the light reflective plane 4a of the ultrasonic waves in the media 1 at an incident angle $\theta$ under the condition satisfying the Bragg's Law. Then, as the diffractive beam 6a leaves out of the media 1 through an anti-reflective film 12 formed on the lower inclined surface 10a of the V-shaped groove 10 formed on the opposite side of the media 1, a beam 6a is refracted again to leave the media 1 in the same direction as the incident beam.

In such a light modulating system, the incident laser beam, the light modulator and the diffractive beam are on the same horizontal plane therefore the design and manufacture of system can be greatly simplified.

Moreover, since the anti-reflective films 11 and 12 of magnesium fluoride are deposited onto the lower inclined surfaces 9a and 9b of the grooves 9 and 10 upon which the laser beam 6 is incident, the loss of light due to reflection on the surfaces of the ultrasonic wave media as would be the case with the conventional system is reduced and the intensity of the diffractive beam can be increased because the diffusion of the ultrasonic waves in the media is prevented by forming the grooves 9 and 10 on the two sides 1b and 1c of the media 1.

Furthermore, since the heat generated by the high power laser beam in the media can be absorbed and discharged outside of the media by means of the light and heat absorbing films 13 of graphite coated on the sides and the bottom of the media, the effect of heat upon the ultrasonic wave is reduced to eliminate the thermal instability and at the same time it is not required to mount an additional light absorbing body which has been required in the conventional system because the body 13 also serves for absorbing a non-diffractive beam 6b which is not modulated.

Moreover, since the intensity of a reflective beam 6d which is not modulated and leaves out of the media 1 through the side 1c can be weakened by the side 1c of the media, the effect of the beam 6d upon the ultrasonic waves can be reduced.

As described hereinbefore, according to the invention, the design and manufacture of the whole system can be facilitated by the relatively simple improvement in construction without requiring the slanted disposition of the laser beam and the light modulator and the intensity of the diffractive beam is increased by approximately 10% as compared with the conventional system and the output of the beam is stable without requiring for the needless light absorbing body.

What is claimed is:

1. An acoustic optical light modulator comprising a hexahedral ultrasonic wave media (1) having a bottom (1a) and two sides (1b, 1c) perpendicular to the bottom, an ultrasonic wave generator (2) attached to the bottom and controlled by a high frequency oscillator (3) connected thereto and a laser source (5) radiating a laser beam (6) incident upon and reflected on a plane (4a) of the ultrasonic waves formed in the media, characterized in that the two sides (1b, 1c) of the media are provided with symmetrical grooves (9, 10) of V-shaped section in the middle portion of the each side thereof, the lower inclined surfaces (9a, 10a) of the grooves being formed with anti-reflective films (11, 12), and the remaining surface portions of the sides including the upper inclined surface (9b, 10b) of the grooves and the bottom (1a) is coated with heat absorbing films (13) which absorb light and heat.

2. The acoustic optical light modulator of claim 1, further characterized in that the anti-reflective films (11, 12) are formed by vacuum depositing magnesium fluoride onto the surfaces (9a, 10a).

3. The acoustic optical light modulator of claim 1, further characterized in that the light and heat absorbing film 13 is formed of graphite.

* * * * *